Patented Jan. 31, 1928.

1,657,544

UNITED STATES PATENT OFFICE.

CHARLES MANNICH, OF FRANKFORT-ON-THE-MAIN, GERMANY.

ALKYL DERIVATIVES OF CYCLO-TRIMETHYLENE-ARYL-PYRAZOLONES AND PROCESS FOR THE MANUFACTURE OF SAME.

No Drawing. Application filed November 29, 1926, Serial No. 151,612, and in Germany December 31, 1925.

It has been found that the alkyl derivatives of cyclo-trimethylene-aryl-pyrazolones possess excellent antipyretic and analgesic properties.

For the manufacture of these new compounds, which form well crystallizing substances, cyclo-trimethylene-aryl-pyrazolones are treated with an alkylizing agent. The alkyl - cyclo - trimethylene - aryl - pyrazolones are in general difficultly soluble in water and ether, easily soluble in alcohol, benzol and in acids. They are to be used for therapeutic purposes.

Example 1.

200 parts of 1-phenyl-3.4-cyclo-trimethylene-5-pyrazolone, obtained by heating β-keto-pentamethylene - carbonic - acid - ethyl-ester and phenyl-hydrazine in presence of a condensing agent, are dissolved in 560 parts of a 20% solution of potassium hydroxide. While cooling and stirring 154 parts of dimethyl-sulphate are slowly added. As soon as the first signs of turbulence appear, the product is seeded in order to obtain a fine and crystalline methylated substance. After an hour's stirring the 1-phenyl-2-methyl-3.4-cyclo-trimethylene-5-pyrazolone is drawn off, dried, crystallized from toluol and then from boiling water. It forms fine white needles which melt at 128° C. They are difficultly soluble in water and ether, easily soluble in alcohol, benzol and in acids. The following formula illustrates the product of this example.

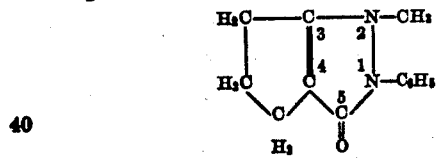

1-phenyl-2-methyl-3.4-cyclo - trimethylene-5-pyrazolone.

Example 2.

200 parts of 1-phenyl-3.4-cyclo-trimethylene-5-pyrazolone are dissolved in 560 parts of a 20% solution of potassium hydroxide, then 200 parts of ethyl-bromide are added and as much alcohol as is necessary for obtaining a homogenous solution, which is then boiled at the reflux condenser during a day. After this 100 parts of a 10% solution of potassium hydroxide and 500 parts of ether are added. The mixture is well shaken up, the layer of ether removed, washed with water, treated with discolouring coal and a great part of the solvent evaporated. After being left to stand the 1-phenyl-2-ethyl-3.4-cyclo-trimethylene-5-pyrazolone is precipitated in slightly yellow coloured needles, which after re-crystallization melt at 143° C. The following formula illustrates the product of this example.

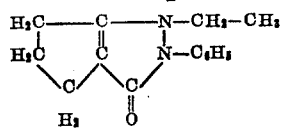

1-phenyl-2-ethyl - 3.4-cyclo - trimethylene-5-pyrazolone.

Example 3.

214 parts of cyclo-trimethylene-tolyl-pyrazolone, obtained by heating β-keto-pentamethylene-carbonic-acid-ethyl-ester and p-tolyl-hydrazine in presence of a condensing agent, are dissolved in a solution of 114 parts of potassium hydroxide in 600 parts of water and 900 parts of alcohol and boiled at the reflux-condenser with 120 parts of ethyl-bromide for 8 hours. The alcohol is then distilled off, the precipitated oil taken up in ether and shaken with lye. The ether solution, after having been purified with coal, is evaporated to a small volume. After some standing, more quickly after seeding, the 1-p-tolyl-2-ethyl-3.4-cyclo - trimethylene-5-pyrazolone is precipitated. The fine, slightly yellow coloured needles are crystallized from alcohol or water. Their melting point is 118° C. The following formula illustrates the product of this example:

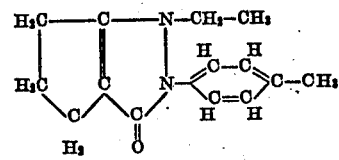

1-p-tolyl-2-ethyl-3.4-cyclo-trimethylene-5-pyrazolone.

Example 4.

279 parts of cyclo-trimethylene-p-bromphenyl-pyrazolone, obtained by heating β-keto - pentamethylene-carbonic-acid-ethyl-ester and p-bromphenyl-hydrazine in presence of a condensing agent, are dissolved in 796 parts of a 10% solution of potassium hydroxide and stirred for a few hours with 240 parts of bromallylbromide. Finally the half-solid precipitate is dissolved in chloroform and by the addition of petrol-ether precipitated in crystals. By re-crystallization from ether the 1-p-bromphenyl-2-β-bromallyl-3.4-cyclo-trimethylene-5-pyrazolone is obtained in slightly brown coloured crystals, which melt at 109° C. They are hardly soluble in water, difficultly soluble in ether and petrol-ether, easily soluble in alcohol, benzol and chloroform. The following formula illustrates the product of this example.

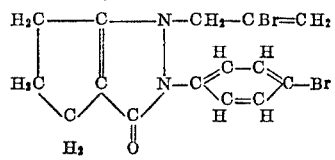

1-p-bromphenol - 2 - β - bromallyl-3.4-cyclo-trimethylene-5-pyrazolone.

Example 5.

In 500 parts of a 20% solution of potassium hydroxide 200 parts of 1-phenyl-3.4-cyclo-trimethylene-5-pyrazolone are dissolved and boiled at the reflux-condenser with 300 parts of benzylchloride and 1500 parts of alcohol for 12 hours. The alcohol is then driven off with steam and the residue, after addition of 50 parts of a 20% solution of potassium hydroxide, shaken with 1500 parts of ether. The ether-solution is removed and from it the benzyl-cyclo-trimethylene-phenyl-pyrazolone-hydrochloride is precipitated by shaking it with 110 parts of concentrated hydrochloric acid. The said hydrochloride is drawn off, re-crystallized from alcohol and decomposed with 100 parts of a 10% solution of sodium hydroxide. The free 1-phenyl - 2 - benzyl - 3.4-cyclo-trimethylene-5-pyrazolone is taken up with ether and crystallized by means of concentration. It is thus obtained in well-shaped, transparent triclinic crystals which melt at 104° C. The following formula illustrates the product of this example.

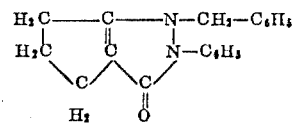

1 - phenyl-2-benzyl-3.4-cyclo - trimethylene-5-pryazolone.

I claim:

1. As new products the alkyl derivatives of cyclo-trimethylene-aryl-pyrazolones which may be produced by treating cyclo-trimethylene-aryl-pyrazolones with an alkylizing agent, the new products forming well crystallizing substances which are in general difficultly soluble in water and ether, easily soluble in alcohol, benzol and in acids, and being suitable for therapeutic purposes.

2. As a new product 1-phenyl-2-methyl-3.4-cyclo - trimethylene-5-pyrazolone which may be produced by treating 1-phenyl-3.4-cyclo - trimethylene - 5 - pyrazolone with a methylating agent, the new product forming fine white needles which melt at 128° C and are difficultly soluble in water and ether, easily soluble in alcohol, benzol and in acids, and being suitable for therapeutic purposes.

3. The process for the manufacture of alkyl derivatives of cyclo-trimethylene-aryl-pyrazolones which consists in treating cyclo-trimethylene-aryl-pyrazolones with an alkylizing agent.

4. The process for the manufacture of 1-phenyl-2 - methyl-3.4-cyclo - trimethylene-5-pyrazolone which consists in treating 1-phenyl - 3.4-cyclo-trimethylene-5-pyrazolone with a methylating agent.

In witness whereof I have hereunto set my hand.

CHARLES MANNICH.